(12) United States Patent
Wen

(10) Patent No.: US 10,370,054 B2
(45) Date of Patent: Aug. 6, 2019

(54) CABLE ARRANGING SYSTEM FOR BICYCLE

(71) Applicant: Yuan-Hung Wen, Chang Hua County (TW)

(72) Inventor: Yuan-Hung Wen, Chang Hua County (TW)

(*) Notice: Subject to any disclaimer, the term of this patent is extended or adjusted under 35 U.S.C. 154(b) by 269 days.

(21) Appl. No.: 15/344,957

(22) Filed: Nov. 7, 2016

(65) Prior Publication Data

US 2017/0137081 A1    May 18, 2017

(30) Foreign Application Priority Data

Nov. 13, 2015   (TW) ............................. 104137515 A

(51) Int. Cl.
| | |
|---|---|
| *B62K 19/32* | (2006.01) |
| *B62K 19/30* | (2006.01) |
| *B62J 99/00* | (2009.01) |
| *B62L 3/02* | (2006.01) |
| *B62K 21/12* | (2006.01) |
| *B62K 23/06* | (2006.01) |
| *B62K 23/02* | (2006.01) |

(52) U.S. Cl.
CPC .............. *B62K 19/32* (2013.01); *B62J 99/00* (2013.01); *B62K 19/30* (2013.01); *B62K 21/12* (2013.01); *B62K 23/02* (2013.01); *B62K 23/06* (2013.01); *B62L 3/02* (2013.01); *B62J 2099/0046* (2013.01)

(58) Field of Classification Search
CPC ........ B62K 19/30; B62K 19/32; B62K 21/12; B62K 23/02; B62K 23/06; B62L 3/02; B62J 2099/0046; B62J 2099/0053
See application file for complete search history.

(56) References Cited

U.S. PATENT DOCUMENTS

| | | | | |
|---|---|---|---|---|
| 4,768,798 A | * | 9/1988 | Reed .......................... | B62J 6/18 188/24.21 |
| 4,966,047 A | * | 10/1990 | Krauer ................... | B62K 23/04 74/489 |

(Continued)

FOREIGN PATENT DOCUMENTS

| | | |
|---|---|---|
| TW | M280341 | 11/2005 |
| TW | M436029 | 8/2012 |

*Primary Examiner* — Joseph M Rocca
*Assistant Examiner* — Maurice L Williams
(74) *Attorney, Agent, or Firm* — Muncy, Geissler, Olds & Lowe, P.C.

(57) ABSTRACT

A cable arranging system is provided for being arranged on a frame of a bicycle, the frame has an axial tube portion and a handle portion, the axial tube portion includes a head tube and a front standing tube disposed through the head tube and rotatable relative to the head tube, the handle portion and the front standing tube are connected with each other and rotatably comovable, the handle portion is rotatable about the head tube and has an operating portion positionably arranged thereto; and the cable arranging system includes a first steering portion positionably assembled to the axial tube portion, and at least one controlling cable. The at least one controlling cable is for being connected with the operating portion and connected to an actuating mechanism of the bicycle, and each said controlling cable is controllably driven by the operating portion.

8 Claims, 4 Drawing Sheets

(56) References Cited

U.S. PATENT DOCUMENTS

| | | | | |
|---|---|---|---|---|
| 7,114,738 B1* | 10/2006 | Chen | B62K 19/00 | 280/281.1 |
| 7,854,442 B2* | 12/2010 | Onogi | B62J 6/18 | 280/281.1 |
| 8,662,519 B2* | 3/2014 | Domahidy | B60T 11/046 | 280/288.3 |
| 9,056,646 B1* | 6/2015 | D'Aluisio | B62K 19/30 | |
| 9,381,974 B2* | 7/2016 | Katsura | B62M 9/122 | |
| 9,409,618 B2* | 8/2016 | Lanz | B62K 21/12 | |
| 2004/0163479 A1* | 8/2004 | Kinoshita | B62J 99/00 | 73/856 |
| 2004/0188976 A1* | 9/2004 | Schmider | B62K 21/00 | 280/279 |
| 2005/0029772 A1* | 2/2005 | Oi | B62J 6/18 | 280/281.1 |
| 2005/0258617 A1* | 11/2005 | Ueno | B62J 6/18 | 280/280 |
| 2005/0280244 A1* | 12/2005 | Watarai | B62J 11/00 | 280/288.4 |
| 2006/0145446 A1* | 7/2006 | Schmider | B62K 19/30 | 280/281.1 |
| 2007/0108723 A1* | 5/2007 | Fukui | B62J 6/18 | 280/276 |
| 2010/0212978 A1* | 8/2010 | Huang | B62K 15/008 | 180/65.31 |
| 2011/0115193 A1* | 5/2011 | Giroux | B62H 5/006 | 280/281.1 |
| 2011/0121538 A1* | 5/2011 | Giroux | B62K 19/32 | 280/280 |
| 2012/0049483 A1* | 3/2012 | Dodman | B62M 6/55 | 280/281.1 |
| 2012/0247263 A1* | 10/2012 | Chubbuck | B62J 99/00 | 74/502.6 |
| 2013/0076000 A1* | 3/2013 | Man | B62K 21/18 | 280/279 |
| 2013/0154234 A1* | 6/2013 | Shadwell | B62J 99/00 | 280/279 |
| 2013/0192405 A1* | 8/2013 | Katsura | B62M 25/08 | 74/473.12 |
| 2014/0116190 A1* | 5/2014 | Sugii | H01B 13/0129 | 74/502.5 |
| 2014/0375017 A1* | 12/2014 | Poss | B62K 19/32 | 280/281.1 |
| 2015/0004412 A1* | 1/2015 | Jankura | B62K 19/30 | 428/377 |
| 2015/0259023 A1* | 9/2015 | Nago | B62K 21/12 | 280/279 |
| 2015/0298758 A1* | 10/2015 | Strien | B62K 21/12 | 280/279 |
| 2015/0367825 A1* | 12/2015 | D'Aluisio | B62L 3/00 | 29/428 |
| 2018/0118300 A1* | 5/2018 | Lin | B62K 21/02 | |

* cited by examiner

CABLE ARRANGING SYSTEM FOR BICYCLE

BACKGROUND OF THE INVENTION

Field of the Invention

The present invention relates to a cable arranging system, and more particularly to a cable arranging system for a bicycle.

Description of the Prior Art

A common cable arranging system for a bicycle includes at least one controlling cable, each said controlling cable includes a controlling core and a rigid exterior tube covering the controlling core, the controlling core is connected to an operator of a handle portion, and when the operator is toggled, the controlling core moves back and forth relative to the rigid exterior tube to control an actuating mechanism of the bicycle. This type of cable arranging systems are disclosed in TWM280341 and TWM436029.

However, when manufacturing a cable of this type of cable arranging system, the controlling core in an interior of the controlling cable needs to be disposed through the rigid exterior tube, so it is difficult and costly to manufacture the controlling cable. In addition, in actual practice, the controlling core in the interior of the controlling cable abrades with the rigid exterior tube for a long term, so the controlling core is easily damaged and is not sustainable for long-term use. The present invention has arisen to mitigate and/or obviate the afore-described disadvantages.

SUMMARY OF THE INVENTION

The major object of the present invention is to provide a cable arranging system for a bicycle without a rigid exterior tube covering a controlling cable, so the controlling cable is easier and cheaper to be manufactured and not easy to be damaged.

To achieve the above and other objects, a cable arranging system is provided for being arranged on a frame of a bicycle, the frame has an axial tube portion and a handle portion which is laterally assembled to the axial tube portion, the axial tube portion includes a head tube and a front standing tube which is disposed through the head tube and rotatable relative to the head tube, the handle portion and the front standing tube are connected with each other and rotatably comovable, the handle portion is rotatable about the head tube, the handle portion has an operating portion positionably arranged thereto; and the cable arranging system includes a first steering portion and at least one controlling cable. The first steering portion is positionably assembled to the axial tube portion. The at least one controlling cable is for being connected with the operating portion and connected to an actuating mechanism of the bicycle after abutting against the first steering portion, and each said controlling cable is controllably driven by the operating portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
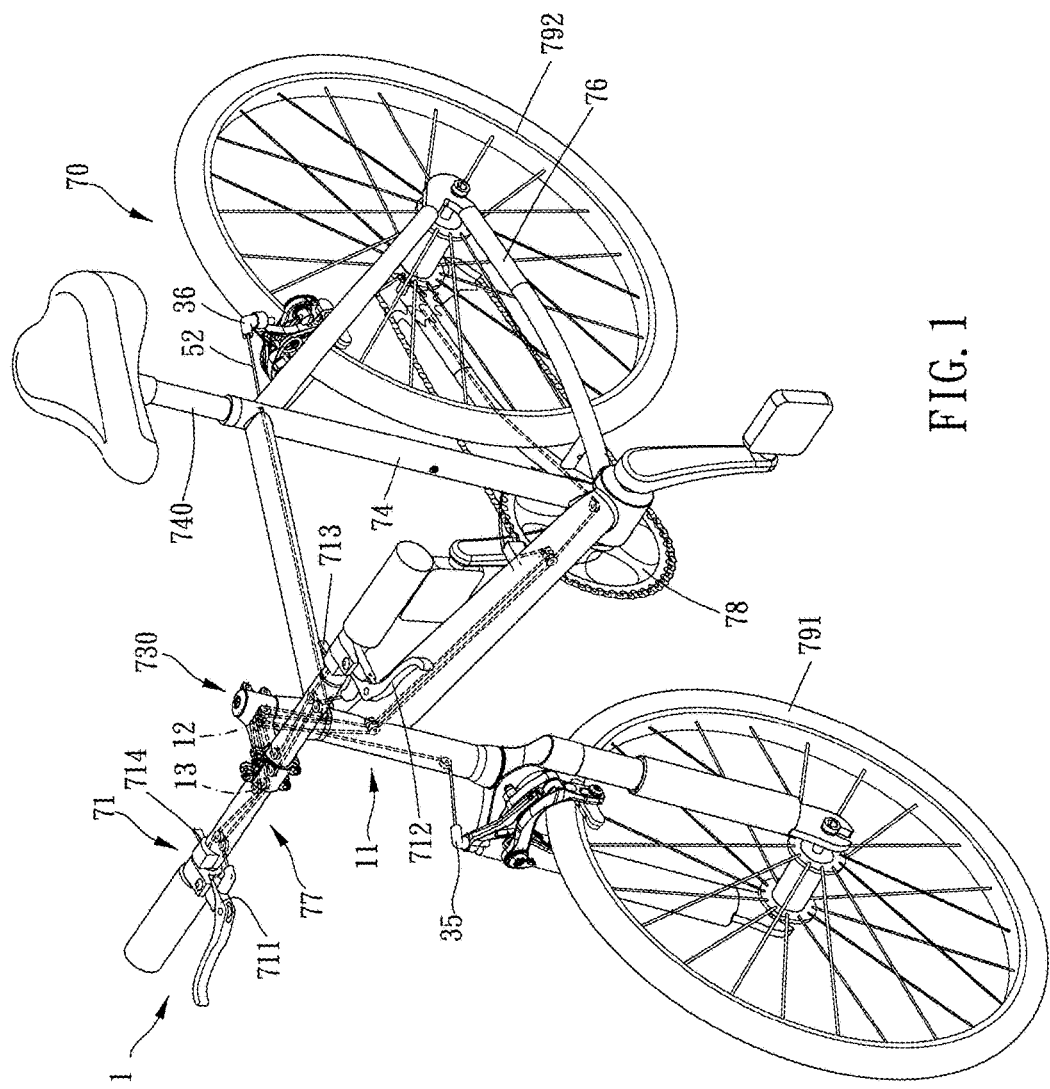
FIG. 1 is a stereogram of a preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 4 for a preferred embodiment of the present invention. A cable arranging system 1 is for being arranged on a frame 73 of a bicycle 70, the frame 73 has an axial tube portion 730 and a handle portion 77 which is laterally assembled to the axial tube portion 730, and the axial tube portion 730 includes a head tube 731 and a front standing tube 732 which is disposed through the head tube 731 and rotatable relative to the head tube 731. The frame 73 further includes an upper tube 751, a lower tube 752, a seat standing tube 74 which is for a seat rod 740 to be assembled thereto and a lower fork 76 which is for saddling on a rear wheel 792 of the bicycle 70 which are connected to the front standing tube 732 and the seat standing tube 74. The handle portion 77 and the front standing tube 732 are connected with each other and rotatably comovable, the handle portion 77 is rotatable about the head tube 731, and the handle portion 77 has an operating portion 71 positionably arranged thereto. Specifically, the handle portion 77 further includes a handle connecting tube 771 which is rotatable about the axial tube portion 730 and a lateral tube 772 which is laterally assembled to the handle connecting tube 771, the handle connecting tube 771 is connected with and between the lateral tube 772 and the front standing tube 732, the lower tube 752 is connected to the front standing tube 732 and the seat standing tube 74, and the lower fork 76 extends from an connection of the lower tube 752 and the seat standing tube 74 toward a rear gear portion 781 of the bicycle 70 to be pivoted to the rear gear portion 781.

In this embodiment, the operating portion 71 includes a front brake operator 711, a rear brake operator 712, a front derailleur operator 713 and a rear derailleur operator 714 which are arranged on the lateral tube 772. It is understandable that the operating portion may include only one to three of the front brake operator, the rear brake operator, the front derailleur operator and the rear derailleur operator.

The cable arranging system 1 includes a first steering portion 11 and at least one controlling cable. It is to be noted that the cable arranging system 1 includes four said controlling cables, and the four controlling cables 51, 52, 53, 54 are respectively defined as a front brake cable, a rear brake cable, a front derailleur cable and a rear derailleur cable, The first steering portion 11 is positionably assembled to the axial tube portion 730, the controlling cables 51, 52, 53, 54 are for being connected with the operating portion 71 and connected to an actuating mechanism 72 of the bicycle 70 after abutting against the first steering portion 11, and each said controlling cable 51, 52, 53, 54 is controllably driven by the operating portion 71. It is to be noted that the controlling cables 51, 52, 53, 54 are not covered by a rigid exterior tube, so the controlling cables 51, 52, 53, 54 need to be pulled tightly so as to be driven by the operating portion 71.

However, to prevent the handle portion 77 from rotating to pull the controlling cables 51, 52, 53, 54, the first steering portion 11 has to be substantially located on a rotational axle of the operating portion 71 (an interior or an exterior of the axial tube portion 730) so that a distance between the operating portion 71 and the first steering portion 11 can be fixed to prevent the controlling cables 51, 52, 53, 54 from being driven randomly. More specifically, the actuating mechanism 72 includes a front brake 721 which is for being arranged on a front wheel 791 of the bicycle 70, a rear brake 722 which is for being arranged on a rear wheel 792 of the bicycle 70, a front derailleur 723 which is disposed on a front gear portion 78 of the bicycle 70 and a rear derailleur 724 which is disposed on the rear wheel 792 of the bicycle 70. It is understandable that the actuating mechanism may only include at least one to three of the front brake, the rear brake, the front derailleur and the rear derailleur.

To order the controlling cables 51, 52, 53, 54 at the handle portion 77, the cable arranging system 1 further includes a second steering portion 12 which is positionably assembled to the axial tube portion 730, the second steering portion 12 and the first steering portion 11 are axially spaced, and the controlling cable 51, 52, 53, 54 which extend from the operating portion 71 pass through the second steering portion 12 for being connected to the first steering portion 11 so that each said controlling cable 51, 52, 53, 54 can be arranged orderly along the axial tube portion 730.

The second steering portion 12 is arranged in an interior of an intersection of the handle portion 77 and the front standing tube 732, and the first steering portion 11 is arranged in an interior of the front standing tube 732 (the first steering portion may be arranged on an exterior of the front standing tube for being assembled easily) so that each said controlling cable 51, 52, 53, 54 can be disposed in the frame 73 to prevent from being exposed and prevent each said controlling cable 51, 52, 53, 54 from being abraded and to make an appearance of the bicycle 70 more preferable. More specifically, the first and second steering portions 11, 12 are rollers pivoted within the frame 73, and each said controlling cable 51, 52, 53, 54 abuts against flanges of the first and second steering portions 11, 12 so as to make each said controlling cable 51, 52, 53, 54 move more smoothly.

More specifically, the second steering portion 12 is arranged on an intersection of the handle connecting tube 771 and the front standing tube 732, an intersection of the lateral tube 772 and the handle connecting tube 771 has a third steering portion 13 which abuts against the at least one controlling cable 51, 52, 53, 54 so that the at least one controlling cable 51, 52, 53, 54 can be arranged orderly along the lateral tube 772, the handle connecting tube 771 and the front standing tube 732.

In addition, the lateral tube 772 further has a first handle guiding portion 21 and a second handle guiding portion 22, the front brake operator 711 has a first curved tube section 31 protruding and bending toward the first handle guiding portion 21, and the rear brake operator 712 has a second curved tube section 32 protruding and bending toward the second handle guiding portion 22. Therefore, the front brake cable (the controlling cable 51) extends from the front brake operator 711 and passes the first curved tube section 31 and the first handle guiding portion 21 sequentially for being connected to the third steering portion 13; and the rear brake cable (the controlling cable 52) extends from the rear brake operator 712 and passes the second curved tube section 32 and the second handle guiding portion 22 sequentially for being connected to the third steering portion 13.

To correspond to the actuating mechanism 72 in different positions, the first steering portion 11 includes a first standing tube guiding portion 111 which corresponds to the front brake 721, a second standing tube guiding portion 112 which corresponds to the rear brake 722, a third standing tube guiding portion 113 and a fourth standing tube guiding portion 114. More specifically, the second standing tube guiding portion 112 is arranged on an intersection of the upper tube 751 and the front standing tube 732, and the third and the fourth standing tube guiding portions 113, 114 are arranged on a connection of the lower tube 752 and the front standing tube 732, Therefore, the first steering portion 11 can respectively guide the front brake cable (the controlling cable 51), the rear brake cable (the controlling cable 52), the front derailleur cable (the controlling cable 53) and the rear derailleur cable (the controlling cable 54) which extend from the second steering portion 12 to the front brake 721, the rear brake 722, the front derailleur 723 and the rear derailleur 724.

Figure 2:
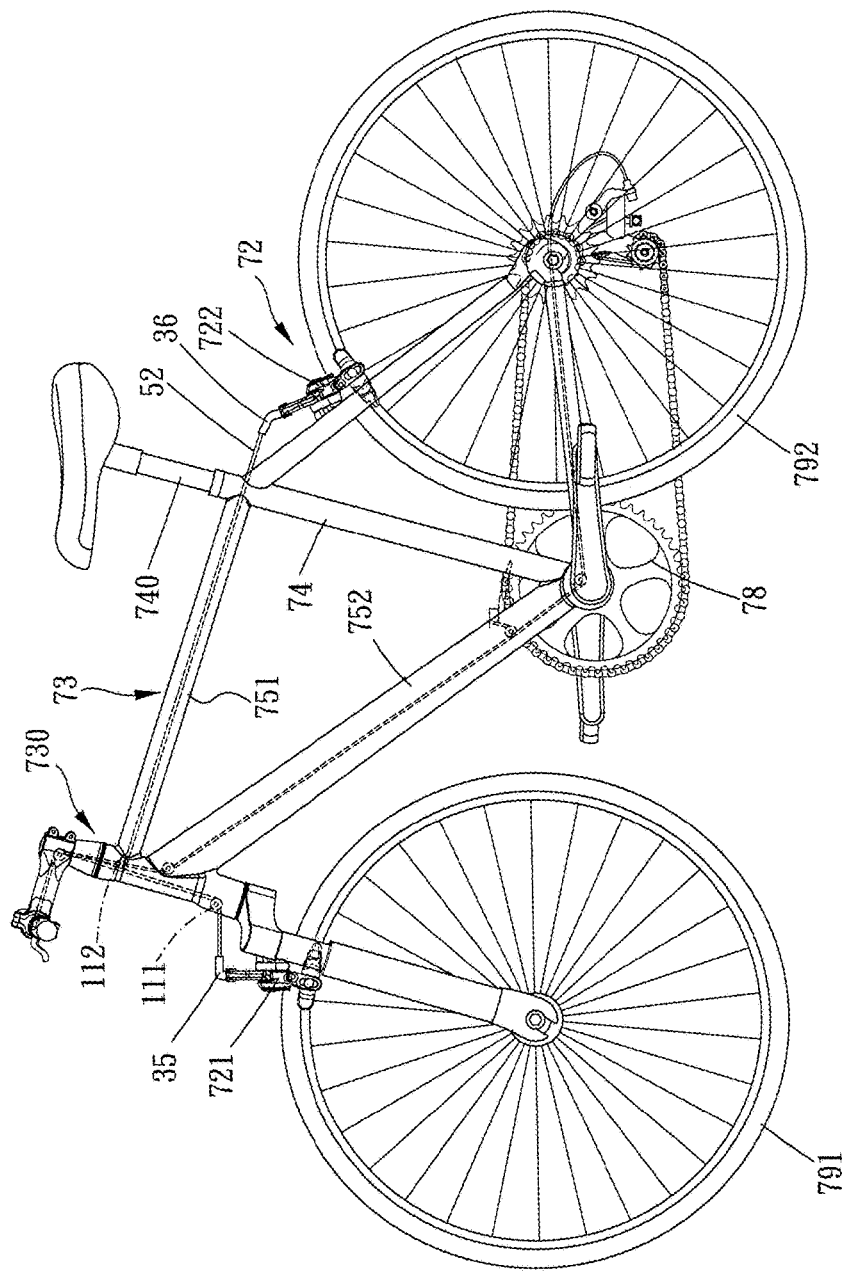
FIG. 2 is a side view of the preferred embodiment of the present invention.
Figure 3:
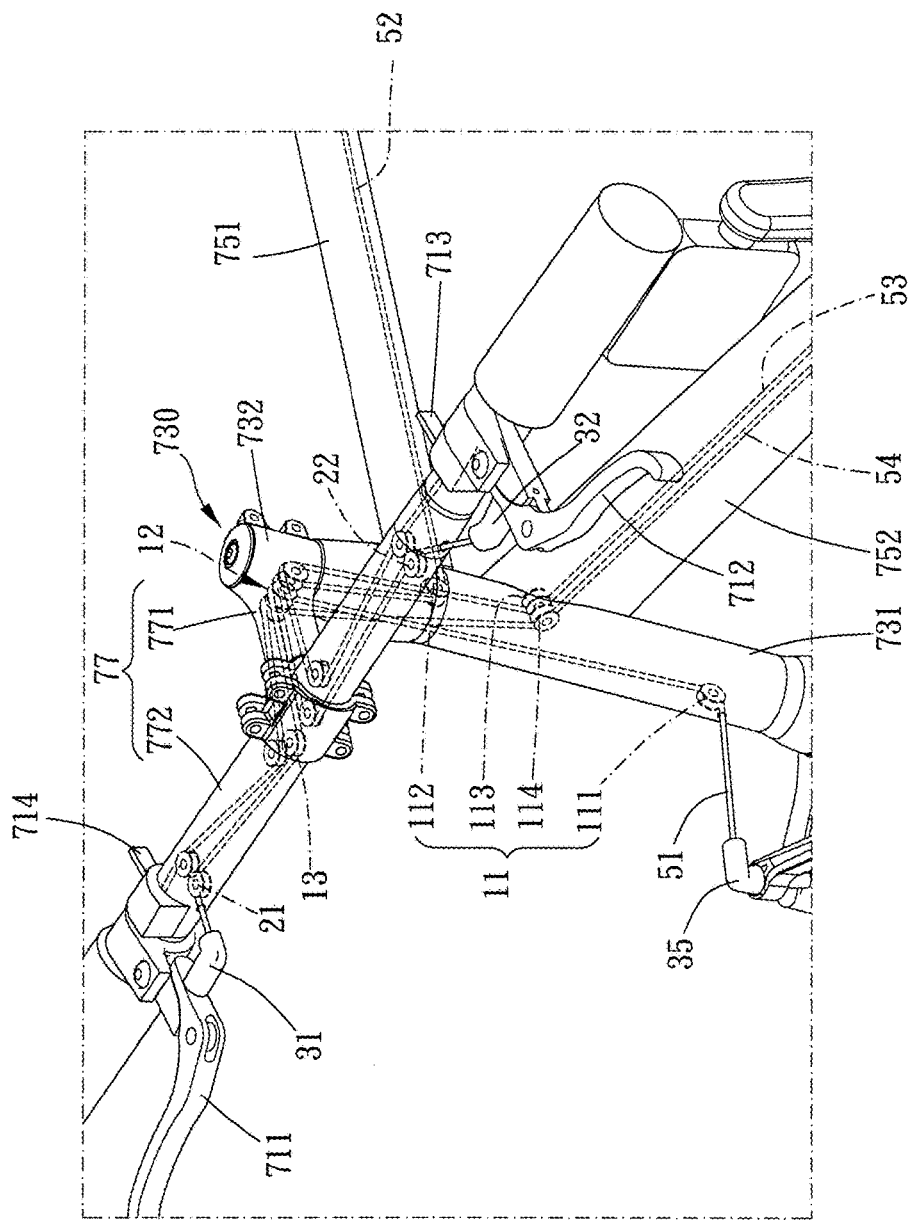
FIG. 3 is a partially-enlarged view of the preferred embodiment of the present invention.
Figure 4:
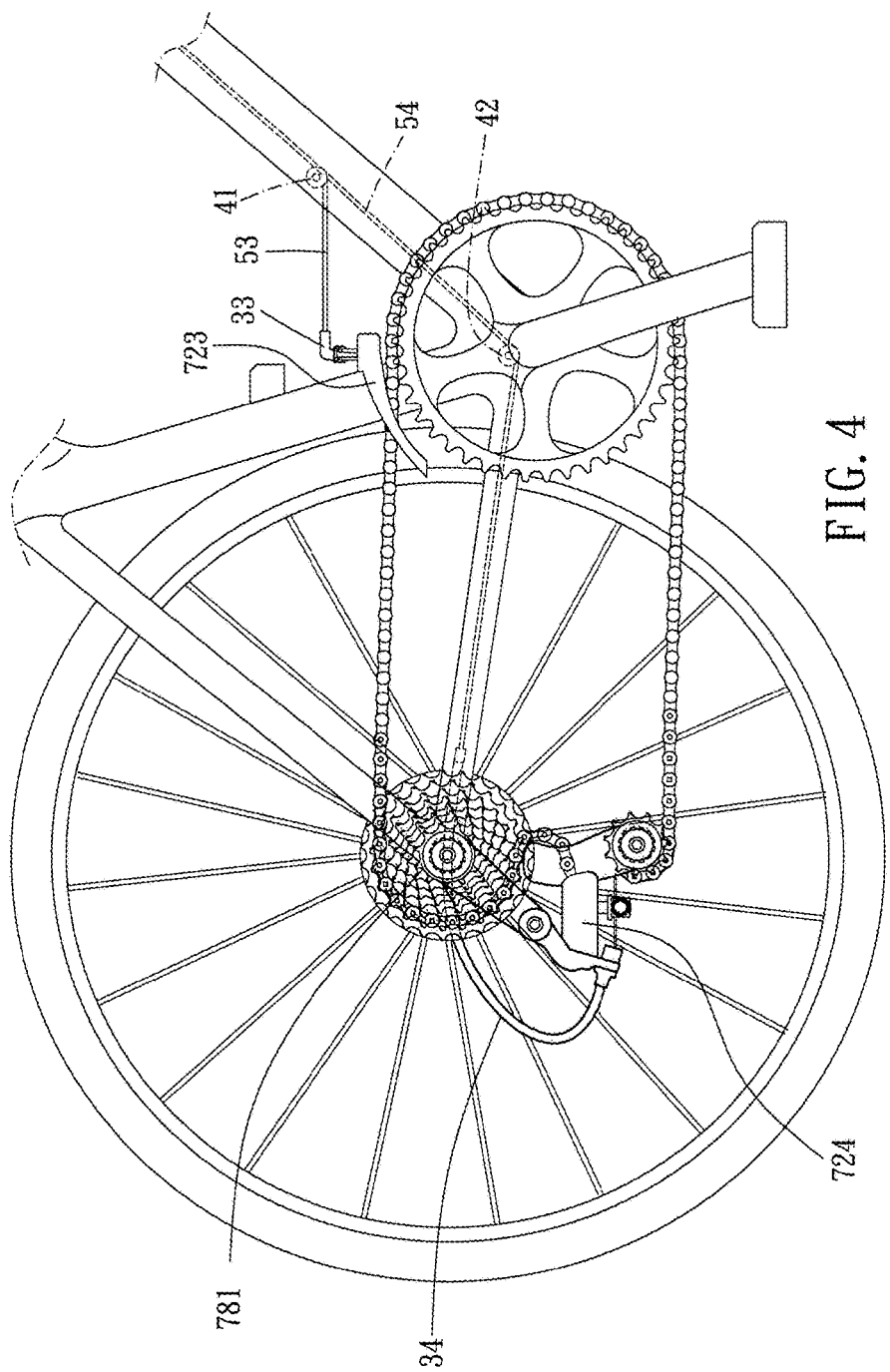
FIG. 4 is a partially-enlarged view of the preferred embodiment of the present invention from another perspective.

To make the front derailleur cable (the controlling cable 53) and the rear derailleur cable (the controlling cable 54) be respectively guided to the front derailleur 723 and the rear derailleur 724 smoothly, the lower tube 752 has a first lower tube steering portion 41 which corresponds to the front derailleur 723, the connection of the seat standing tube 74 and the lower tube 752 has the front gear portion 78, a third curved tube section 33 extends upward from the front derailleur 723 and bends toward the first lower tube steering portion 41, the rear gear portion has the rear derailleur 724, a connection of the lower fork 76 and the lower tube 752 has a second lower tube steering portion 42, the rear derailleur 724 extends to form a fourth curved tube section 34 which is substantially U-shaped, one of two ends of the fourth curved tube section 34 is connected to the rear derailleur 724, and the other of the two ends of the fourth curved tube section 34 bends toward the second lower tube steering portion 42. The front derailleur cable passing through the third standing tube guiding portion 113 further passes through the first lower tube steering portion 41 and the third curved tube section 33 sequentially for being connected to the front derailleur 723, and the rear derailleur cable passing through the fourth standing tube guiding portion 114 further passes through the second lower tube steering portion 42 and the fourth curved tube section 34 sequentially for being connected to the rear derailleur 724. It is to be noted that the first, second, third and fourth curved tube sections 31, 32, 33, 34 are rigid tubes which can guide the brake cables and prevent the brake cables from being abraded. It is understandable that as shown in FIG. 2, a fifth curved tube section 35 located in the front brake 721 and a sixth curved tube section 36 located in the rear brake 722 are further provided for the front and rear brake cables to be disposed therethrough to prevent the front and rear brake cables from being abraded.

Given the above, followings are descriptions of an actual operation of each said controlling cable 51, 52, 53, 54.

The front brake cable (the controlling cable 51) extends from the front brake operator 711 and passes through the first curved tube section 31, the first handle guiding portion 21, the third steering portion 13, the second steering portion 12 and the first standing tube guiding portion 111 sequentially for being connected to the front brake 721. Therefore, the front brake cable can be arranged from the front brake operator 711 and along the lateral tube 772, the handle connecting tube 771 and the front standing tube 732 sequentially.

The rear brake cable (the controlling cable 52) extends from the operating portion 71 and passes through the second curved tube section 32, the second handle guiding portion 22, the third steering portion 13, the second steering portion 12 and the second standing tube guiding portion 112 sequentially for being connected to the rear brake 722. Therefore, the rear brake cable can be arranged from the rear brake operator 712 and along the lateral tube 772, the handle connecting tube 771, the front standing tube 732 and the upper tube 751 sequentially.

The front derailleur cable (the controlling cable 53) extends from the front derailleur operator 713 and passes through the third steering portion 13, the second steering portion 12, the third standing tube guiding portion 113, the first lower tube steering portion 41 and the third curved tube section 33 sequentially for being connected to the front derailleur 723. Therefore, the front derailleur cable can be arranged from the front derailleur operator 713 and along the lateral tube 772, the handle connecting tube 771, the front standing tube 732 and the lower tube 752 sequentially.

The rear derailleur cable (the controlling cable 54) extends from the rear derailleur operator 714 and passes through the third steering portion 13, the second steering portion 12, the fourth standing tube guiding portion 114, the second lower tube steering portion 42 and the fourth curved tube section 34 sequentially for being connected to the rear derailleur 724. Therefore, the rear derailleur cable can be arranged from the rear derailleur operator 714 and along the lateral tube 772, the handle connecting tube 771, the front standing tube 732, the lower tube 752 and the lower fork 76 sequentially.

Given the above, the cable arranging system does not need a rigid exterior tube covering a controlling cable, so the controlling cable is easier and cheaper to be manufactured and not easy to be damaged.

While we have shown and described various embodiments in accordance with the present invention, it should be clear to those skilled in the art that further embodiments may be made without departing from the scope of the present invention.

What is claimed is:

1. A cable arranging system, for being arranged on a frame of a bicycle, the frame having an axial tube portion and a handle portion which is laterally assembled to the axial tube portion, the axial tube portion including a head tube and a front standing tube which is disposed through the head tube and rotatable relative to the head tube, the handle portion and the front standing tube being connected with each other and rotatably comovable, the handle portion being rotatable about the head tube, the handle portion having an operating portion positionably arranged thereto, the cable arranging system including:

a first steering portion, positionably assembled to the axial tube portion;
    at least one controlling cable, for being connected with the operating portion and connected to an actuating mechanism of the bicycle after abutting against the first steering portion, each said controlling cable being controllably driven by the operating portion; and
    a second steering portion which is positionably assembled to the axial tube portion, the second steering portion and the first steering portion being axially spaced, and the at least one controlling cable which extends from the operating portion passing through the second steering portion for being connected to the first steering portion,
    wherein the handle portion further includes a handle connecting tube which is rotatable relative to the head tube and a lateral tube which is laterally assembled to the handle connecting tube, the handle connecting tube is connected with and between the lateral tube and the front standing tube, the actuating mechanism includes a front brake which is for being arranged on a front wheel of the bicycle, the first steering portion includes a first standing tube guiding portion which corresponds to the front brake, the operating portion includes a front brake operator which is arranged on the lateral tube, the second steering portion is arranged on an intersection of the handle connecting tube and the front standing tube, an intersection of the lateral tube and the handle connecting tube has a third steering portion which abuts against the at least one controlling cable, one said controlling cable is defined as a front brake cable, and the front brake cable extends from the front brake operator and passes through the third steering portion, the second steering portion and the first standing tube guiding portion sequentially for being connected to the front brake.

2. The cable arranging system of claim 1, wherein the lateral tube further has a first handle guiding portion, the front brake operator has a first curved tube section protruding therefrom and bending toward the first handle guiding portion, and the front brake cable which extends from the front brake operator passes through the first curved tube section and the first handle guiding portion sequentially for being connected to the third steering portion.

3. The cable arranging system of claim 1, wherein the actuating mechanism includes a front derailleur and a rear derailleur which are respectively disposed on a front gear portion and a rear wheel of the bicycle, the first steering portion further includes a third standing tube guiding portion and a fourth standing tube guiding portion, the operating portion includes a front derailleur operator and a rear derailleur operator which are arranged on the lateral tube, two said controlling cables are respectively defined as a front derailleur cable and a rear derailleur cable, the front derailleur cable extends from the front derailleur operator and passes through the third steering portion, the second steering portion and the third standing tube guiding portion sequentially for being connected to the front derailleur, and the rear derailleur cable extends from the rear derailleur operator and passes through the third steering portion, the second steering portion and the fourth standing tube guiding portion sequentially for being connected to the rear derailleur.

4. The cable arranging system of claim 3, wherein the frame further includes a lower tube, a seat standing tube which is for a seat rod to be assembled thereto and a lower fork which is for saddling on the rear wheel of the bicycle, the lower tube is connected to the front standing tube and the seat standing tube, the lower fork extends from a connection of the lower tube and the seat standing tube toward a rear gear portion of the bicycle and pivoted to the rear gear portion, the third and fourth standing tube guiding portions are arranged on a connection of the lower tube and the front standing tube, the lower tube has a first lower tube steering portion which corresponds to the front derailleur, the connection of the seat standing tube and the lower tube has the front gear portion, a third curved tube section extends upward from the front derailleur and toward the first lower tube steering portion, the front derailleur cable passing through the third standing tube guiding portion further passes through the first lower tube steering portion and the third curved tube section sequentially for being connected to the front derailleur, the rear gear portion has the rear derailleur, a connection of the lower fork and the lower tube has a second lower tube steering portion, the rear derailleur extends to form a fourth curved tube section which is U-shaped, one of two ends of the fourth curved tube section is connected to the rear derailleur, the other of the two ends of the fourth curved tube section bends toward the second lower tube steering portion, and the rear derailleur cable passing through the fourth standing tube guiding portion further passes through the second lower tube steering portion and the fourth curved tube section sequentially for being connected to the rear derailleur.

5. A cable arranging system, for being arranged on a frame of a bicycle, the frame having an axial tube portion and a handle portion which is laterally assembled to the axial tube portion, the axial tube portion including a head tube and a front standing tube which is disposed through the head tube and rotatable relative to the head tube, the handle portion and the front standing tube being connected with each other and rotatably comovable, the handle portion being rotatable about the head tube, the handle portion having an operating portion positionably arranged thereto, the cable arranging system including:
- a first steering portion, positionably assembled to the axial tube portion;
- at least one controlling cable, for being connected with the operating portion and connected to an actuating mechanism of the bicycle after abutting against the first steering portion, each said controlling cable being controllably driven by the operating portion; and
- a second steering portion which is positionably assembled to the axial tube portion, the second steering portion and the first steering portion being axially spaced, and the at least one controlling cable which extends from the operating portion passing through the second steering portion for being connected to the first steering portion,
- wherein the second steering portion is arranged in an interior of an intersection of the handle portion and the front standing tube, and the first steering portion is arranged in an interior of the front standing tube.

6. A cable arranging system, for being arranged on a frame of a bicycle, the frame having an axial tube portion and a handle portion which is laterally assembled to the axial tube portion, the axial tube portion including a head tube and a front standing tube which is disposed through the head tube and rotatable relative to the head tube, the handle portion and the front standing tube being connected with each other and rotatably comovable, the handle portion being rotatable about the head tube, the handle portion having an operating portion positionably arranged thereto, the cable arranging system including:
- a first steering portion, positionably assembled to the axial tube portion;
- at least one controlling cable, for being connected with the operating portion and connected to an actuating mechanism of the bicycle after abutting against the first steering portion, each said controlling cable being controllably driven by the operating portion; and
- a second steering portion which is positionably assembled to the axial tube portion, the second steering portion and the first steering portion being axially spaced, and the at least one controlling cable which extends from the operating portion passing through the second steering portion for being connected to the first steering portion,
- wherein the first and second steering portions are rollers pivoted within the frame, and the at least one controlling cable abuts against flanges of the first and second steering portions.

7. The cable arranging system of claim 6, wherein the handle portion further includes a handle connecting tube which is rotatable about the head tube and a lateral tube which is laterally assembled to the handle connecting tube, the handle connecting tube is connected with and between the lateral tube and the front standing tube, the actuating mechanism includes a rear brake which is for being arranged on a rear wheel of the bicycle, the first steering portion includes a second standing tube guiding portion which corresponds to the rear brake, the operating portion includes a rear brake operator which is arranged on the lateral tube, the second steering portion is arranged on an intersection of the handle connecting tube and the front standing tube, an intersection of the lateral tube and the handle connecting tube has a third steering portion which abuts against the at least one controlling cable, one said controlling cable is defined as a rear brake cable, and the rear brake cable extends from the rear brake operator and passes through the third steering portion, the second steering portion and the second standing tube guiding portion sequentially for being connected to the rear brake.

8. The cable arranging system of claim 7, wherein the lateral tube further has a second handle guiding portion, the rear brake operator has a second curved tube section protruding therefrom and bending toward the second handle guiding portion, the frame further includes an upper tube which is connected to the front standing tube and a seat standing tube, the second standing tube guiding portion is arranged on an intersection of the upper tube and the front standing tube, and the rear brake cable which extends from the rear brake operator passes through the second curved tube section and the second handle guiding portion sequentially for being connected to the third steering portion.

* * * * *